No. 740,190. PATENTED SEPT. 29, 1903.
O. B. SHALLENBERGER, DEC'D.
M. W. SHALLENBERGER, EXECUTRIX.
PHASE ADJUSTING METHOD AND MEANS FOR ALTERNATING CURRENT APPARATUS.
APPLICATION FILED JAN. 9, 1897.
NO MODEL.
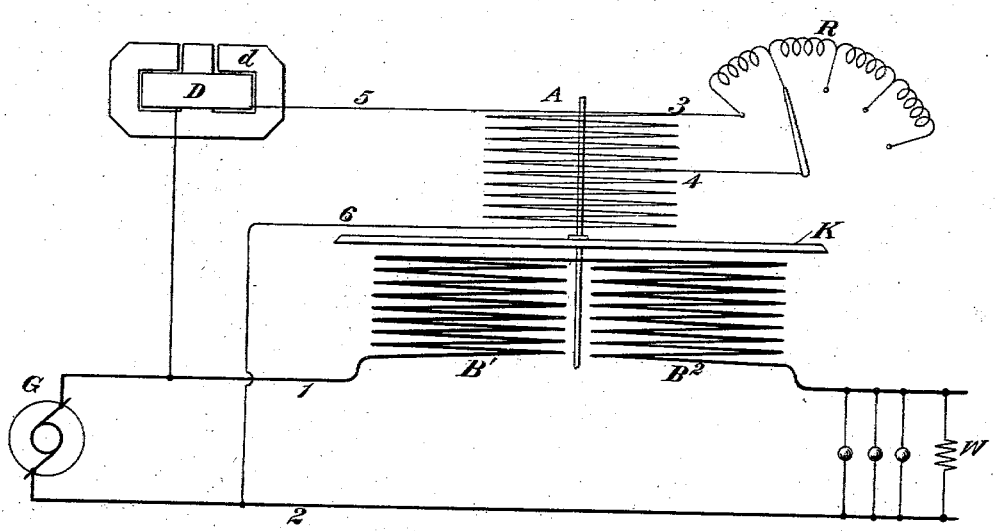

No. 740,190. Patented September 29, 1903.

UNITED STATES PATENT OFFICE.

OLIVER B. SHALLENBERGER, OF ROCHESTER, PENNSYLVANIA; MARY W. SHALLENBERGER, EXECUTRIX OF SAID OLIVER B. SHALLENBERGER, DECEASED, ASSIGNOR TO WESTINGHOUSE ELECTRIC & MANUFACTURING COMPANY, A CORPORATION OF PENNSYLVANIA.

PHASE-ADJUSTING METHOD AND MEANS FOR ALTERNATING-CURRENT APPARATUS.

SPECIFICATION forming part of Letters Patent No. 740,190, dated September 29, 1903.

Application filed January 9, 1897. Serial No. 618,538. (No model.)

*To all whom it may concern:*

Be it known that I, OLIVER B. SHALLENBERGER, a citizen of the United States, residing at Rochester, in the county of Beaver and State of Pennsylvania, have invented a new and useful Improvement in Phase-Adjusting Methods and Means for Alternating-Current Apparatus, of which the following is a specification.

My invention relates to apparatus for the utilization of alternating currents, and more particularly such apparatus as involves the use of alternating magnetic fields differing in phase.

It is particularly applicable to instruments for indicating, measuring, or recording alternating currents, and I will describe it principally with reference to such use, although I do not limit myself to any particular application of the novel features of my invention.

It is well known that an alternating current may be caused to lag behind the impressed electromotive force which produces it by the introduction into the circuit of a coil possessing more or less self-induction. The magnetic field in the neighborhood of a conductor carrying such a current lags to a corresponding degree; but the lag is limited under practical conditions to an amount somewhat less than a quarter period—that is, ninety degrees—as commonly represented.

By the use of my invention it is possible to greatly augment the angular displacement of the magnetic field from the impressed electromotive force, so that by its use in connection with a self-induction coil, as above stated, or an equivalent device any desired phase-angle may be obtained within wide limits. I employ it usually in connection with coils possessing a high coefficient of self-induction where it is desired to obtain a magnetic field as nearly as possible in quadrature with the impressed electromotive force or with another magnetic field having a definite phase relation to the impressed electromotive force. I have described the use of this principle in connection with certain measuring instruments in patents granted me on January 1, 1895, and numbered 531,867, 531,868, 531,870, and it is therefore unnecessary to describe specifically herein all the modifications and the detailed construction of such apparatus.

In Patent No. 531,867 I have described the use of an inductance-coil for producing in a shunt-circuit connected with a main circuit carrying a single-phase current a current which lags approximately ninety degrees in phase behind the impressed electromotive force; but it is difficult in practice to produce this exact degree of lag by the use of an inductance-coil alone, and in Patent No. 548,231, granted to me October 22, 1895, I have described a method of and means for modifying or supplementing the action of the inductance-coil, so as to produce the exact degree of lag required. My present invention relates to a method of and means for producing this last-mentioned result differing from those described in my said Patent No. 548,231 and which have certain advantages over them.

My invention may be more readily understood by reference to the accompanying drawing, in which the organization of the apparatus is indicated diagrammatically.

The drawing is to be regarded as indicating in a general way the application of my invention to an electrical measuring instrument or any apparatus requiring the phase relations hereinbefore mentioned.

G represents a suitable source of alternating current conveyed by the conductors 1 2 to the work-circuit W. In series with the conductor 1 are connected two coils B' and B², which constitute field-coils of the apparatus. A single coil or more than two may be used in place of the two coils B' and B², if desired. A is also a field-coil connected in shunt-circuit to the conductors 1 2 by means of the conductors 5 6, and there is included in series therewith the inductance-coil D, which is provided with a core $d$. The coil A may also be provided with a core, if desired. The construction of this inductance-coil is preferably that which has been fully described in my previous patent already referred to; but by the use of my present invention other and less efficient forms of inductance-coils may be employed with satisfactory results.

K is a disk of conducting material in inductive relation with the field-coils and in which rotation is produced by the shifting field of the coils in a manner well understood. A resistance-coil of any convenient construction is connected at two points 3 and 4 of the field-coil A. These points may include more or less of the coil A and in certain cases the whole coil. The resistance R may be made adjustable, but in practice usually consists in the construction of the apparatus of a definite length of high-resistance wire. It may be disposed around the coil A, forming a single piece for convenience of manufacture, or it may be constructed in a separate piece. The resistance R forms a shunt to the parts of the coil A included between the connections 3 4, and this resistance also when taken in connection with the parts of the coil shunted by it constitutes a closed secondary of which the whole coil A is primary. This organization produces by its action the same general result as is produced by the separate circuit described in my Patent No. 548,231, already referred to, by creating a resultant magnetic field and producing a greater phase displacement than that due to the action of the inductance-coil alone. The exact phase relation may be modified as desired by varying the relation of the resistance R and the number of convolutions of the coil A included between the connections 3 4. In practice the desired adjustment is effected by selecting suitable points in the coil A for the connections 3 4, which points may include the whole coil, and then varying the length of the resistance-wire until the proper adjustment is reached.

I have described my invention as applied to an electrical measuring instrument; but it will of course be understood that the invention is not limited to this use, but may be employed with any kind of apparatus requiring a definite phase relation.

The resistance-coil R may be made adjustable, as shown in the drawing, to increase the accuracy of the apparatus when used with currents of widely-differing periodicity.

I claim as my invention—

1. The combination with a field-coil, of an inductive resistance in series therewith, an auxiliary circuit composed of a part or the whole of said field-coil and of a shunt thereto, containing a non-inductive variable resistance, a second field-coil and an armature in inductive relation to said field-coils, substantially as described.

2. In an electrical actuating device, the combination with means for producing a lagging current, of a field-coil traversed by said lagging current and a variable non-inductive shunt to said field-coil for modifying the phase-angle of the field of said coil, so as to produce a resultant field practically in quadrature with the impressed electromotive force, substantially as described.

3. The combination with means for producing a lagging current, of a field-coil traversed by such lagging current, a variable non-inductive shunt to said field-coil for modifying the phase-angle of the field of said coil, so as to produce a resultant field practically in quadrature with the impressed electromotive force, a second field-coil and an armature in inductive relation to said field-coils, substantially as described.

4. The combination with means for producing a lagging current, of a field-coil traversed by such lagging current, a variable non-inductive shunt to said field-coil for modifying the phase-angle of the field of said coil, so as to produce a resultant field practically in quadrature with the impressed electromotive force, a second coil the field of which combines with the field of the first-named coil so as to produce a resultant shifting field, and an armature in inductive relation to such shifting field, substantially as described.

5. In an apparatus for utilizing a magnetic field delayed behind the impressed electromotive force of the circuit from which it is energized, the combination with a means for producing a lagging current, of a magnetizing-coil arranged to be traversed by the lagging current when the apparatus is energized, and a variable non-inductive shunt to more or less of the turns of the field-coil whereby the lag of the magnetic field is modified to obtain the desired phase relation.

6. The combination in an alternating-current circuit of a field-coil connected in series in said circuit a second field-coil in shunt upon said circuit, an inductive resistance in series with said second field-coil and a variable non-inductive resistance in shunt thereto.

7. In an alternating-current meter operated by currents differing in phase and comprising two actuating-coils, means in series with one of said coils for causing the current therein to lag behind its impressed electromotive force approximately ninety degrees and variable means in shunt to said coil for increasing said angle of lag.

In testimony whereof I have hereto subscribed my name this 28th day of December, 1896.

OLIVER B. SHALLENBERGER.

Witnesses:
LEONARD E. CURTIS,
RALPH D. MERSHON.